United States Patent
Iida et al.

(10) Patent No.: US 7,262,954 B1
(45) Date of Patent: Aug. 28, 2007

(54) SOLID ELECTROLYTIC CAPACITOR ELEMENT, SOLID ELECTROLYTIC CAPACITOR, AND MANUFACTURING METHOD THEREFOR

(75) Inventors: Takahisa Iida, Tottori (JP); Mutsumi Yano, Osaka (JP); Kazuhiro Takatani, Osaka (JP); Hiroshi Nonoue, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/607,374

(22) Filed: Dec. 1, 2006

(30) Foreign Application Priority Data

Dec. 28, 2005 (JP) ............................. 2005-379645

(51) Int. Cl.
*H01G 9/04* (2006.01)
*H01G 9/00* (2006.01)
(52) U.S. Cl. ..................... 361/528; 361/523; 29/25.03
(58) Field of Classification Search ........ 361/523–524, 361/525, 528–529; 29/25.03
See application file for complete search history.

(56) References Cited

U.S. PATENT DOCUMENTS 4,858,078 A * 8/1989 Morimoto et al. .......... 361/527
6,334,945 B1 * 1/2002 Lessner et al. ............. 205/687
6,954,351 B2 * 10/2005 Konuma et al. ............ 361/523

FOREIGN PATENT DOCUMENTS

JP 1993-234826 10/1993

* cited by examiner

*Primary Examiner*—Eric Thomas
(74) *Attorney, Agent, or Firm*—Masuvalley & Partners

(57) ABSTRACT

The objective of the current invention is to provide a solid electrolytic capacitor element with low equivalent series resistance. In this solid electrolytic capacitor element, an anode including a porous sintered body, and a dielectric layer are sequentially formed on an anode lead so as to cover a portion of the anode lead. An intermediate layer including polyethylene glycol is formed on the dielectric layer so as to cover an area around the dielectric layer. An electrolyte layer that includes polypyrrole is formed on the intermediate layer so as to cover an area around the intermediate layer. A cathode that includes: a first electrically conductive layer mainly including graphite particles and a second electrically conductive layer mainly including silver particles is formed on the electrolyte layer so as to cover an area surrounding the electrolyte layer.

10 Claims, 1 Drawing Sheet

SOLID ELECTROLYTIC CAPACITOR ELEMENT, SOLID ELECTROLYTIC CAPACITOR, AND MANUFACTURING METHOD THEREFOR

TECHNICAL FIELD

The current invention relates to a solid electrolytic capacitor element having an anode using a valve metal or an alloy consisting mainly of valve metal, a dielectric layer formed by anodizing the anode above, specifically, the current invention relates to, a solid electrolytic capacitor element with low equivalent series resistance (hereinafter referred as ESR), a solid electrolytic capacitor, and manufacturing method therefor.

BACKGROUND OF INVENTION

Solid electrolytic capacitors have widely been used for various electronic devices, specially in recent years, due to the necessity for instantaneously supplying current to a signal process circuit along with speed-up of signal process circuits of electronic devices, such as personal computers A solid electrolytic capacitor with lower ESR value at high-frequency area is desired. However, due to high contact resistance between a solid electrolyte layer and a dielectric layer, there is a problem of increasing ESR.

To decrease this contact resistance, a solid electrolytic capacitor element having an intermediate layer comprised of organic silane between a solid electrolyte and a dielectric layer has been developed. An example of such solid electrolytic capacitor element is in Japanese published unexamined patent application No. 1993-234826. However, sufficient reduction of contact resistance could not be reached even with such structure, and there has been a limit in reducing ESR of a solid electrolytic capacitor element.

The objective of the current invention is to reduce ESR of a solid electrolytic capacitor element and to provide a manufacturing method of a solid electrolytic capacitor element able to reduce ESR.

BRIEF SUMMARY OF THE INVENTION

To solve such issues described above, the solid electrolytic capacitor element relating to the current invention is a solid electrolytic capacitor element comprising an anode using a valve metal or an alloy consisting mainly of valve metal, a dielectric layer formed by anodizing the anode, an electrolyte layer including a conductive polymer formed on the dielectric layer, and a cathode formed on the electrolyte layer, and characterized by an intermediate layer including polyethylene glycol between the dielectric layer and the electrolyte layer.

For example, tantalum, niobium, and titanium can be used as a valve metal.

In the above embodiment, adhesiveness of the dielectric layer and electrolyte layer including the conductive polymer can be increased, and this can reduce the contact resistance between the dielectric layer and the electrolyte layer, therefore the ESR of a solid electrolytic capacitor element can be reduced. It is thought that the reason the adhesiveness can be increased is that the polyethylene glycol forms chemical bonding, such as hydrogen bonding, between the dielectric and the conductive polymer.

The molecular weight of the polyethylene glycol can be no less than 400 and no more than 1200.

The molecular weight of the polyethylene glycol can preferably be no less than 800 and no more than 1000.

The film thickness of the intermediate layer described above including polyethylene glycol, can be from approximately 0.5 nm to approximately 20 nm.

In this structure, adhesiveness of the dielectric layer and the electrolyte layer comprising the conductive polymer can be increased, and this allows further reduction of the contact resistance between the dielectric layer and the electrolyte layer, therefore the solid electrolytic capacitor element with lower ESR can be provided.

A method of manufacturing the solid electrolytic capacitor element of the current invention comprises a process for forming a dielectric layer consisting mainly of an oxide of a valve metal or an alloy consisting mainly of a valve metal by anodizing an anode using a valve metal or an alloy consisting mainly of valve metal, a process for coating the surface of the dielectric layer with a polyethylene glycol layer by dipping the dielectric layer in a polyethylene glycol solution and a process for forming an electrolyte layer including a conductive polymer on the surface of the polyethylene glycol layer.

By using such a manufacturing method, the polyethylene glycol layer can be evenly formed on the surface of the dielectric layer, which enables adherence of the dielectric layer and electrolyte layer including the conductive polymer layer adequately across the whole area of that adhesion face, so that the interface of the dielectric layer and the electrolyte layer with low contact resistance can be formed, therefore, the solid electrolytic capacitor element able to reduce ESR can be provided.

The molecular weight of this polyethylene glycol can be comprised to no less than 400 and no more than 1200.

Further, the molecular weight of the polyethylene glycol can preferably be no less than 800 and no more than 1000.

Still further, the film thickness of above polyethylene glycol layer can be from approximately 0.5 nm to approximately 20 nm.

The polyethylene glycol solution above can be characterized by dissolving polyethylene glycol with any of water, ethanol or acetone.

As for other aspects of the invention, there is a solid electrolytic capacitor comprising an anode using a valve metal or an alloy consisting mainly of a valve metal, a dielectric layer formed by anodizing said anode, an electrolyte layer including conductive polymer formed on said dielectric layer, a cathode formed on said electrolyte layer, and an intermediate layer including polyethylene glycol between the dielectric layer and the electrolyte layer, wherein on the solid electric capacitor element, an anode terminal is formed on said anode, a cathode terminal is formed on said cathode, and a mold resin is formed such that respective edges of the anode terminal and the cathode terminal are located outside the mold resin.

In the solid electrolytic capacitor element and the solid electrolytic capacitor of the current invention, adhesiveness of the dielectric layer and the electrolyte layer including conductive polymer can be increased, and this can reduces the contact resistance between the dielectric layer and the electrolyte layer, therefore the ESR of the solid electrolytic capacitor element can be reduced.

Also, according to the manufacturing method for solid electrolytic capacitor element of the current invention, the polyethylene glycol layer can be evenly formed on the surface of the dielectric layer, which improves the adhesiveness of the dielectric layer and the electrolyte layer including the conductive polymer layer across the whole area of that adhesion face, so that the interface of the dielectric layer and the electrolyte layer with low contact resistance can be formed, therefore, the solid electrolytic capacitor element able to reduce ESR can be provided.

DETAILED DESCRIPTION OF INVENTION

Figure 1:
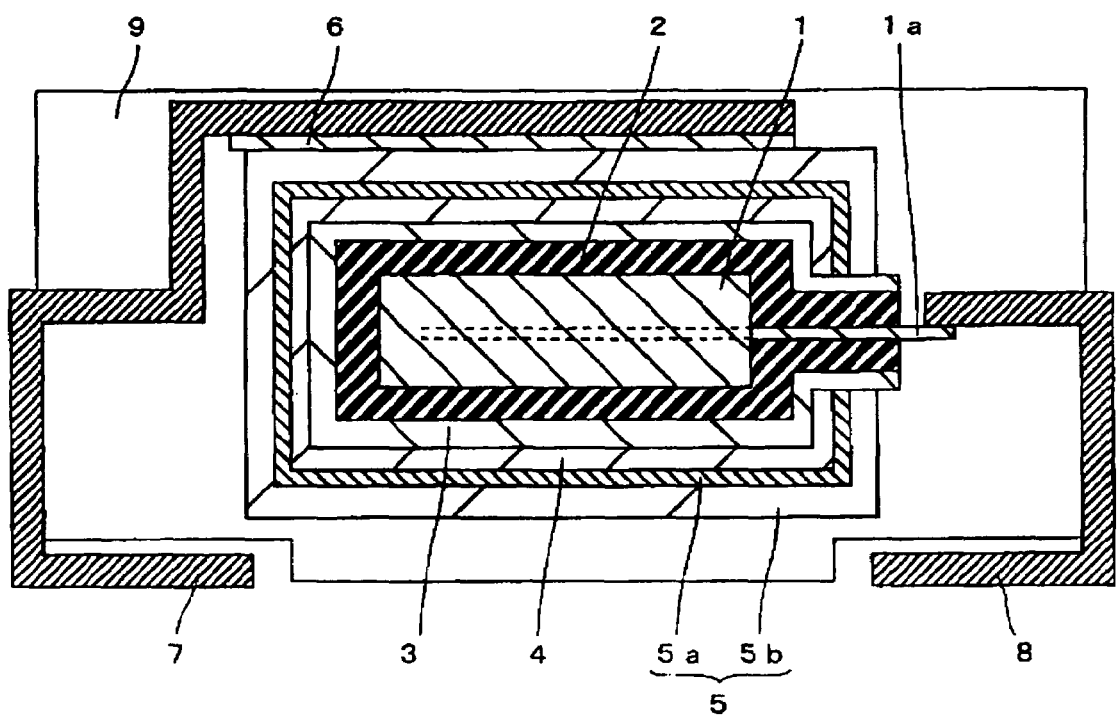
FIG. 1 is a cross section view of a solid electrolytic capacitor element for embodiment 1 of the current invention.

Embodiments of the current invention will hereinafter be described in reference to the drawing.

Embodiment 1

FIG. 1 is a cross section view of a solid electrolytic capacitor element of the current invention. A structure of the solid electrolytic capacitor element as it relates to the embodiment 1 of the current invention is hereinafter described.

First, as shown in FIG. 1, in the solid electrolytic capacitor element in the embodiment 1 of the current invention, a virtually plate-like anode 1 comprised of a tantalum porous sintered body that is fabricated by sintering tantalum powder with an average grain size of approximately 2 μm, in vacuum, is formed on an anode lead 1a comprised of tantalum so as to cover a portion of the anode lead 1a. At this time, the tantalum is an example of a "valve metal" and comprises the anode of the current invention.

A dielectric layer 2 consisting mainly of a tantalum oxide is formed on the anode 1, so as to cover an area surrounding the anode 1.

An intermediate layer 3 comprised of polyethylene glycol (hereinafter referred as PEG) having a film thickness (approximately 5 nm) is formed on the dielectric layer 2 so as to virtually uniformly cover an area surrounding the dielectric layer 2

An electrolyte layer 4 comprised of polypyrrole is formed on the intermediate layer 3 so as to cover an area surrounding the intermediate layer 3.

A cathode 5 is formed on the electrolyte layer 4 so as to cover an area surrounding the electrolyte layer 4. The cathode 5 is comprised of: a first electrically conductive layer 5a consisting mainly of graphite particles, which is formed so as to cover the area surrounding the electrolyte layer 4; and a second electrically conductive layer 5b consisting mainly of silver particles, which is formed so as to cover an area surrounding the first electrically conductive layer 5a The top surface of an area surrounding the cathode 5 is formed with an electrically conductive adhesive layer 6, through which the cathode 5 and a cathode terminal 7 are interconnected. The solid electrolytic capacitor element in the embodiment 1 of current invention is thus formed. Also, an anode terminal 8 is welded onto the anode lead 1a exposed from the anode 1. Further a mold-packaging resin 9 is formed around the second electrically conductive layer 5b, the cathode terminal 7 and an anode terminal 8 such that respective edges of the cathode and anode terminals 7 and 8 can be located outside the mold resin. The solid electrolytic capacitor in embodiment 1 of the current invention is thus configured.

Next, a manufacturing method of the solid electrolytic capacitor element for embodiment 1 shown in FIG. 1 will be described.

At first, a virtually plate-like anode 1 that is fabricated by sintering tantalum powder with an average grain size of approximately 2 μm, in vacuum, is formed on an anode lead 1a comprised of tantalum oxide so as to cover a portion of the anode lead 1a.

Then, the anode 1 was anodized in an approximately 0.1 wt. % phosphoric acid solution, which was held at approximately 60° C., by applying a constant voltage of approximately 8 V for approximately 10 hours. This allowed the dielectric layer 2 comprised of tantalum to be formed so as to cover the area surrounding the anode 1.

Thereafter, by dipping the anode 1 formed with the dielectric layer 2 into the aqueous solution containing PEG with average molecular weight of 1000 and approximately 0.001 wt %, uniformly deposited PEG onto the surface of the dielectric layer 2. Then, dried the anode 1 at approximately 65° C. for approximately 10 minutes. An intermediate layer 3 comprised of PEG with a film thickness of 5 nm was formed on the dielectric layer 2 so as to cover an area surrounding the dielectric layer 2.

Thereafter, an electrolyte layer 4 comprised of a polypyrrole by chemical polymerization and so on is formed on the intermediate layer 3.

Thereafter, the first electrically conductive layer 5a consisting mainly of graphite particles was formed by coating a graphite paste on the electrolyte layer 4 and then drying the paste at approximately 80° C. for approximately 30 minutes. Also, the second electrically conductive layer 5b consisting mainly of silver particles was formed by coating a silver paste on the first electrically conductive layer 5a so as to cover the area surrounding the first electrically conductive layer 5a and then drying the paste at approximately 170° C. for approximately 30 minutes. Thus, the cathode 5 wherein the first electrically conductive layer 5a and the second electrically conductive layer 5b were laminated was formed on the electrolyte layer 4 so as to cover the area surrounding the intermediate layer 3.

And, after an electrically conductive adhesive had been coated on the cathode terminal 7, the cathode 5 and the cathode terminal 7 were brought into contact with each other through the electrically conductive adhesive. The electrically conductive adhesive layer 6 through which the cathode 5 and the cathode terminal 7 were interconnected was formed by drying the electrically conductive adhesive at approximately 60° C. for approximately 30 minutes while pressing it with the cathode 5 and the cathode terminal 7. The solid electrolytic capacitor element in embodiment 1 of the current invention was thus configured.

Subsequently, the anode terminal 8 was connected onto the anode lead 1a by welding. Further, the mold-packaging resin 9 was formed such that respective edges of the cathode terminal 7 and the anode terminal 8 were able to be located outside the mold-packaging resin 9. The solid electrolytic capacitor according to the embodiment 1 of current invention was thus fabricated.

As other specimens relate to the embodiment 1, solid electrolytic capacitor elements having similar structures to that of above were fabricated respectively, except that instead of using tantalum powder with average grain size of approximately 2 μm as a material of anode 1, using tantalum-niobium alloy powder with average grain size of approximately 2 μm, and niobium powder with average grain size of approximately 2 μm respectively, were employed.

COMPARATIVE EXAMPLE 1

As a comparative example, a solid electrolytic capacitor element which has a similar structure to that of above embodiment 1 was fabricated, except that there is no intermediate layer 3 between the dielectric layer 2 and the electrolyte layer 4.

COMPARATIVE EXAMPLE 2

As a comparative example 2, a solid electrolytic capacitor element similar to a conventional solid electrolytic capacitor element was fabricated. That is, the solid electrolytic capacitor element similar to that of the embodiment 1 was fabricated, except that instead of using the intermediate layer 3 comprising PEG, an intermediate layer consisting mainly of organic silane which comprises octadecyltriethoxysilane (hereinafter referred as OTES), was used.

In this comparative example, the intermediate layer consisting mainly of an organic silane comprised of OTES is formed as follows.

After dipping into a n-hexane solution containing 0.1 wt % of OTES, the anode 1 which has the dialectic layer 2 formed was air dried for 60 minutes at 125° C. This allowed an intermediate layer having a film thickness of 1 nm comprising OTES to be formed on the dielectric layer 2 so as to cover an area around the dielectric layer 2.

ESR measurements were performed at a frequency of 100 kHz on the solid electrolytic capacitor elements fabricated in the cases of embodiment 1, 2, 3, and Comparative Example 1 and 2. The ESR measurements were performed using an LCR meter by applying voltage between the cathode terminal 7 and the anode terminal 8. The measurement results are listed in Table 1. In addition, Table 1 lists values determined by normalizing the measurement results in Embodiment 1 and 2 and using the measurement result in Comparative Example 1 as a reference value of 100.

TABLE 1

|  | Material of Anode | Material of Intermediate layer | ESR |
| --- | --- | --- | --- |
| Embodiment 1 | Tantalum | PEG | 86 |
|  | Tantalum - Niobium Alloy | PEG | 85 |
|  | Niobium | PEG | 87 |
| Comparative Example 1 | Tantalum | None | 100 |
| Comparative Example 2 | Tantalum | OTES | 98 |

As listed in table 1, it turned out that the solid electrolytic capacitor element of embodiment 1 has decreased ESR lower than that of the solid electrolytic capacitor elements of comparative example 1 and 2. It is thought that the reason for decrease in ESR even with relatively high resistivity of PEG of approximately $10^4 \Omega \cdot cm$ is because adhesiveness between the dielectric layer 2 and the electrolyte layer 4 was able to improve by virtually uniformly forming the intermediate layer 3 comprised of PEG having a small film thickness between the electrolyte layer 4 and the cathode 5.

Embodiment 2

In this embodiment 2, a solid electrolytic capacitor element having a similar structure to that of the embodiment 1 was fabricated, except that instead of the intermediate layer 3 comprised of PEG with average molecular weight 1000 in embodiment 1 above using tantalum as an anode material, forming a intermediate layer 3 comprised of PEG with different molecular weights (molecular weights 100, 400, 800, 1200, 1500, 2000, 4000).

In this embodiment, solid electrolytic capacitor elements having a intermediate layer 3 comprised of PEG having a film thickness of between approximately 0.5 nm and approximately 20 nm in-between the dielectric layer 2 and the electrolyte layer 4 were fabricated respectively in the manner similar to that of embodiment 1, except that instead of using the aqueous solution containing PEG with a molecular weight of 1000 and approximately 0.001 wt % used in the embodiment 1, aqueous solutions containing PEG with molecular weights of 100, 400, 800, 1200, 1500, 2000, 4000, and approximately 0.001 wt % respectively, were used.

As for the solid electrolytic capacitor elements fabricated for the embodiment 2, ESR measurements at frequency of 100 kHz were also performed using an LCR meter by applying voltage between the cathode terminal 7 and the anode terminal 8. The measurement results for the embodiment 1 above along with in case of comparative example 1 and 2 are listed in Table 2. In addition, Table 2 lists values determined by using the measurement result in comparative example 1 as a reference value of 100 and normalizing the measurement results in Embodiment 1, 2 and comparative example 2. Also, the anode materials for embodiment 1, 2, and comparative example 1, 2 are tantalum.

TABLE 2

|  | Intermediate Layer | | |
| --- | --- | --- | --- |
|  | Material | Average Molecular Weight | ESR |
| Embodiment 2 | PEG | 100 | 96 |
|  | PEG | 400 | 90 |
|  | PEG | 800 | 88 |
|  | PEG | 1200 | 90 |
|  | PEG | 1500 | 95 |
|  | PEG | 2000 | 95 |
|  | PEG | 4000 | 96 |
| Embodiment 1 | PEG | 1000 | 86 |
| Comparative Example 1 | None | — | 100 |
| Comparative Example 2 | OTES | — | 98 |

As listed in table 2, it turned out that when the average molecular weight of PEG in the intermediate layer 3 is from 100 to 4000, the solid electrolytic capacitor element of embodiment 2 can reduce ESR lower than that of the solid electrolytic capacitor element of comparative example 1 not having an intermediate layer and comparative example 2 having the intermediate layer comprised of OTES. Further, when PEG with a molecular weight no less than 400 and no greater than 1200, a reduction in ESR grater than 10% has been found.

In the embodiments 1 and 2, PEG can be virtually uniformly deposited on the surface of dielectric layer 2 by dipping the dielectric layer 2 into an aqueous solution containing PEG. Also, the film thickness of the intermediate layer can be controlled by repeatedly dipping into the above aqueous solution.

Also, the virtually plate-like anode 1 comprised of a porous sintered body was used in Embodiments 1 and 2. Because this causes a contact area between the dielectric layer 2 and the electrolyte layer 4 to be increased, and also micro-irregularities are formed on the surface of the dielectric layer 2, the adhesiveness between the dielectric layer 2 and the electrolyte layer 4 is improved. As a result, the ESR can be further reduced.

Further, the anode 1 comprised of tantalum that is a valve metal is used in embodiments 1 and 2. For this reason, anodizing the anode 1 enables a dielectric layer consisting mainly of tantalum oxide to be readily obtained.

In addition, all of the examples disclosed herein are for illustrative purposes in all aspects, and should not be considered limiting. The scope of the current invention is defined not by the description of the above-described examples but by the appended claims, and includes all equivalents and variations that fall within the scope of the claims.

Further, in the above-described embodiment, the intermediate layer 3 was formed by dipping the dielectric layer 2 into an aqueous solution containing PEG; however, the current invention is not limited to this, and it may be formed by depositing PEG using a method such as spraying the above aqueous solution onto the surface of the dielectric layer 2.

Still further, in the above-described embodiment, the electrolyte layer 4 was comprised of polypyrrole; however, the current invention is not limited to this, and it may consist mainly of other electrically conductive polymers.

Also, in the above-described embodiment, the first electrically conductive layer 5a consisted mainly of graphite particles; however, the current invention is not limited to this, and it may contain carbon particles other than the graphite particles.

Still further, in the above-described embodiment, the anode 1 was comprised of tantalum, tantalum-niobium alloy, or niobium however, the current invention is not limited to this, and it may consist mainly of another valve metal such as aluminum, titanium or, alternatively, it may be an alloy consisting mainly of such a valve metal.

Still further, in the above-described embodiment, the phosphoric acid solution was used for anodizing the anode 1; however, the current invention is not limited to this, an aqueous solution containing fluorine such as ammonium fluoride solution, potassium fluoride solution, sodium fluoride solution or hydrofluoric acid solution or, alternatively, sulfuric acid may be used.

Still further, in the above-described embodiment, the anode 1 was in the form of a virtual plate comprised of a porous sintered body; however, the current invention is not limited to this, and it may be comprised of a column-shape or a metal foil.

What is claimed is:

1. A solid electrolytic capacitor element comprising:
    an anode using a valve metal or an alloy consisting mainly of a valve metal;
    a dielectric layer formed by anodizing said anode;
    an electrolyte layer including a conductive polymer, formed on said dielectric layer;
    a cathode formed on said electrolyte layer; and
    an intermediate layer including polyethylene glycol between said dielectric layer and electrolyte layer.

2. The solid electrolytic capacitor element according to claim 1, wherein a molecular weight of said polyethylene glycol is no less than 400 and no more than 1200.

3. The solid electrolytic capacitor element according to claim 2, wherein a molecular weight of said polyethylene glycol is no less than 800 and no more than 1000.

4. The solid electrolytic capacitor element according to claim 1, wherein a film thickness of said intermediate layer including polyethylene glycol is from approximately 0.5 nm to approximately 20 nm.

5. A method of manufacturing a solid electrolytic capacitor element, the method comprising the steps of:
    forming a dielectric layer consisting mainly of an oxide of a valve metal or an alloy consisting mainly of the valve metal by anodizing an anode using the valve metal or an alloy consisting mainly of the valve metal;
    coating a surface of said dielectric layer with a polyethylene glycol layer by dipping said dielectric layer in a polyethylene glycol solution; and
    forming an electrolyte layer including a conductive polymer on a surface of said polyethylene glycol layer.

6. The method for manufacturing the solid electrolytic capacitor element according to claim 5, wherein a molecular weight of said polyethylene glycol is no less than 400 and no more than 1200.

7. The method for manufacturing the solid electrolytic capacitor element according to claim 6, wherein a molecular weight of said polyethylene glycol is no less than 800 and no more than 1000.

8. The method for manufacturing the solid electrolytic capacitor element according to claim 5, wherein a film thickness of said polyethylene glycol layer is from approximately 0.5 nm to approximately 20 nm.

9. The method for manufacturing the solid electrolytic capacitor element according to claim 5, wherein said polyethylene glycol solution is a solution of polyethylene glycol dissolved with any of a water, an ethanol or an acetone.

10. A solid electrolytic capacitor comprising:
    an anode using a valve metal or an alloy consisting mainly of the valve metal;
    a dielectric layer formed by anodizing said anode;
    an electrolyte layer including a conductive polymer, formed on said dielectric layer;
    a cathode formed on said electrolyte layer;
    an intermediate layer including a polyethylene glycol located between said dielectric layer and said electrolyte layer; and
    wherein, an anode terminal is formed on said anode, a cathode terminal is formed on said cathode, and a mold resin is formed such that respective edges of the anode terminal and the cathode terminal are located outside the mold resin.

* * * * *